Oct. 7, 1930.  A. T. POTTER  1,777,326
WINDSHIELD CONSTRUCTION
Original Filed May 4, 1925
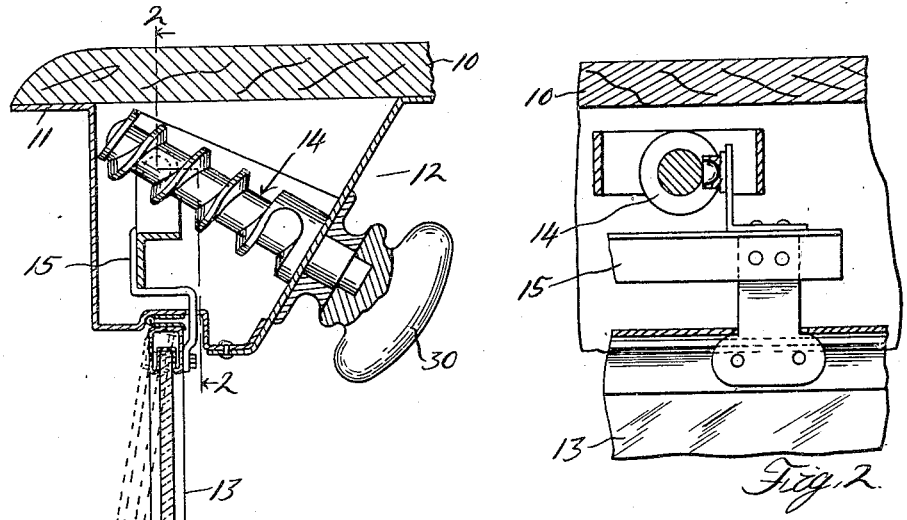
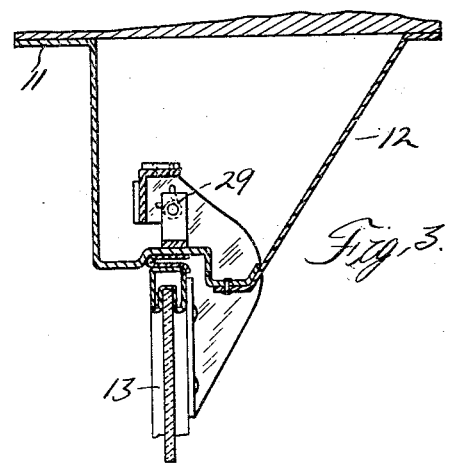
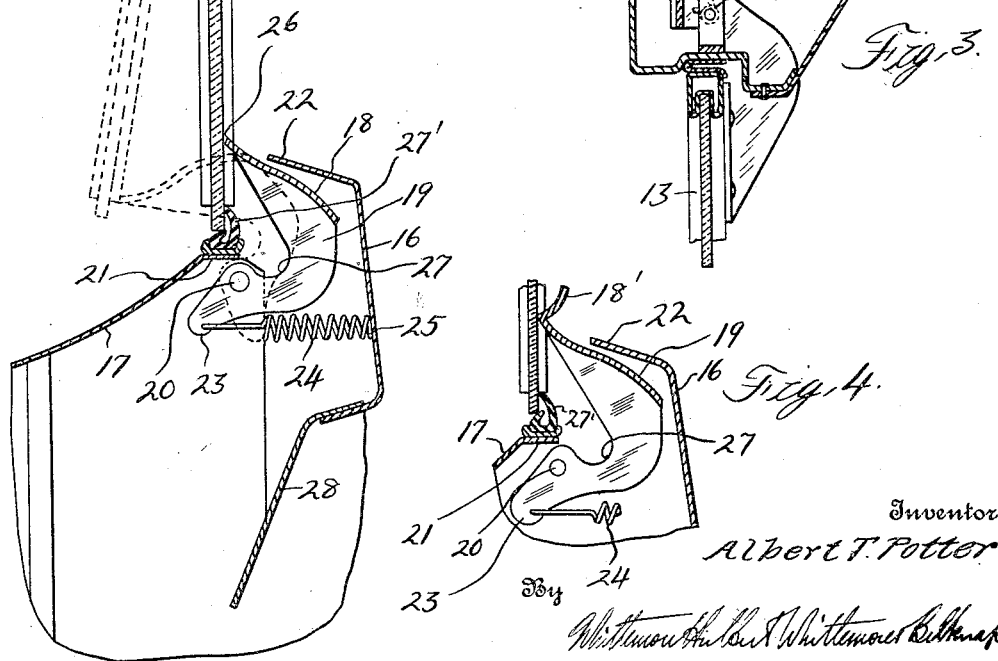
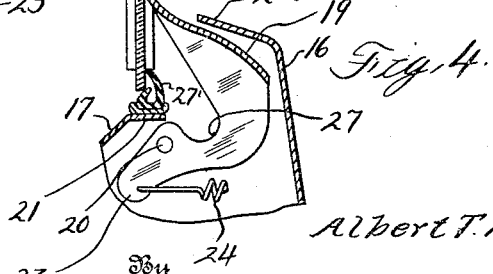
Inventor
Albert T. Potter Patented Oct. 7, 1930

1,777,326

UNITED STATES PATENT OFFICE

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN

WINDSHIELD CONSTRUCTION

Original application filed May 4, 1925, Serial No. 27,991. Divided and this application filed August 8, 1927. Serial No. 211,560.

This invention relates to windshields and more particularly to an improved ventilator means cooperating with and controlled by the windshield.

The invention has as one of its objects, the provision of a ventilator in an association with a windshield and adjacent the vehicle body which results in an automatic control of the ventilator upon adjustment of the windshield and an efficiency of operation irrespective of the adjustment of the windshield.

The invention has also as one of its objects to simplify, render more efficient, and improve generally constructions of this general character.

Other objects, advantages and features of construction will be made more apparent as this description proceeds, especially when considered in connection with the accompanying drawings, wherein Figure 1 is a fragmentary vertical longitudinal sectional view of a vehicle showing my improved invention;

Figure 2 is an enlarged fragmentary view taken substantially on the plane indicated by the line 2—2 of Figure 1;

Figure 3 is a fragmentary sectional view showing the connection between the windshield and header; and Figure 4 is a fragmentary sectional view of a modified form of construction.

This application is a division of my copending application, Serial No. 27,991 filed May 4, 1925.

Referring now to the drawings wherein like reference characters indicate like parts, it will be noted that there is secured to the roof or top frame 10 of the vehicle body, a channel-shaped windshield header 11 constituting a housing for the windshield operating mechanism 12 and a support for the swinging windshield 13. The operating mechanism for swinging the windshield may be of any suitable construction herein shown as comprising the operating screw 14 and operating arm 15 having one end secured to the windshield and the opposite end engaging the screw substantially as shown.

The reference character 16 indicates the instrument board of the vehicle arranged adjacent to but spaced from the cowl 17 in the customary manner. Arranged between the instrument board 16 and the lower edge of the windshield 13, is a ventilator hood or shield 18 formed preferably with lateral downwardly directed extensions 19 by means of which the hood 18 is pivotally supported as at 20 upon adjacent portions of the vehicle. While the points of pivotal support for the ventilator hood 18 are shown as arranged under the sill 21 of the cowl 17, the substantially horizontal hood 18 is, in its operative position, shown in full lines in Figure 1, substantially contained within or enclosed by the instrument board and particularly the lateral extensions 22 thereof. The downwardly projecting portions 19 of hood 18 are extended past pivots 20 to form arms 23 to which are connected springs 24, which are in turn connected as at 25 to instrument board 16. These springs tend normally, to swing hood 18 about its pivots toward the dotted line position shown in Figure 1, which movement is, however resisted by the engagement of the forward edge 26 of the hood with the windshield 13.

However, when the windshield 13 is adjusted toward open position, springs 24 will swing hood 18 and maintain the edge portion 26 in engagement with the windshield 13 during a portion of the movement of the latter. That is, hood 18 will follow windshield 13 in its movement until the edges 27 of extensions 19 engage the edge of the sill 21, whereupon the movement of the hood 18 will be interrupted and the windshield may thereupon be adjusted further into open position, while hood 18 remains in the position indicated in dotted lines in Figure 1. Upon return movement of the windshield 13, it will obviously engage hood 18 and swing the same again into the position shown in full lines in Figure 1.

When the windshield is closed with its lower edge engaging the weather excluding strip 27', obviously no ventilation is possible and the air is absolutely excluded by the windshield. However, during the initial steps of adjustment of the windshield, that is, during any of its positions of adjustment the position shown in full and dotted lines in Figure 1, air will be admitted, which air will pass rearwardly to the instrument board 16 and then downwardly under the cowl 17 and between the cowl and extension 28 carried by the instrument board. It will be noted that even in the most extended position of hood 18 the rear edge thereof lies under the forward edge of the lateral extension 22 of the instrument board, so that air as well as other elements will be intercepted from passing upwardly and against the occupants of the vehicle. As long as hood 18 is in engagement with the windshield in any of its open adjusted positions, the ventilation will be limited, air passing under the hood 18 and through the passage-way formed by the instrument board with its extensions and cowl 17. However, it is proposed to so proportion the operating member 14 and the other parts cooperating therewith, that the windshield may be swung upwardly a distance sufficient for instance, to cause the lower edge of the windshield to clear the line of vision of the driver and consequently in any of the positions in which the lower edge of the windshield is out of engagement with the hood 18. Air will also pass under the edge of the windshield and backwardly into the vehicle over the top of hood 18. However, even in such instances, air will also be directed by the hood forwardly and downwardly under the cowl and this desired ventilation thus being also obtained.

In Figure 4 which is a fragmentary view of the lower edge of the windshield, the hood 18 is shown as provided with an annular backwardly inclined flange or lip 18' which will direct some air upwardly in those positions of the parts when the windshield has moved away from the hood 18.

The operating mechanism for the windshield is inherently self locking as will be immediately apparent so that the windshield 13 will remain in any of its adjusted positions and will not be displaced therefrom even by the vibrations or jars of the vehicle in transit. Springs 29 which normally urge the windshield towards closed position, tend to offset or equalize the opening effort exerted by springs 24 through the medium of hood 18. Hence, windshield operating element 30 may be rotated and the windshield adjusted in either direction with a minimum amount of effort.

While an illustrated embodiment of this invention has been shown and described somewhat in detail, it will be immediately apparent to those skilled in this art that various modifications in the details of construction as well as rearrangement of parts may be resorted to as found necessary or desirable without departing from the spirit and scope of this invention and to this end reservation is made to make such changes as may come within the purview of the accompanying claims.

What I claim as my invention is:

1. In combination, a swinging windshield, means for operating said windshield and an air deflector extending longitudinally of the windshield and engaging the lower edge thereof when the windshield is in closed or partially open position and being operable thereby.

2. In combination, a swinging windshield, means for operating said windshield, and a pivoted air deflector held in direct contact with the lower edge of said windshield when the same is inclosed or partially open position whereby said deflector is operated upon movement of said windshield.

3. In combination, a swinging windshield, means for operating the same, and an automatically operable air deflector restrained in direct contact with said windshield when the same is in closed or partially open position and being operable upon movement of the windshield.

4. In combination, an outwardly swinging windshield, means for operating said windshield, and an air deflector contacting with the rear face of said windshield when the same is in closed or partially open position and being movable therewith.

5. In combination, an outwardly swinging windshield, means for operating said windshield, a pivotal air deflector arranged adjacent the swinging edge of the said windshield having a portion engageable with the rear face of the windshield when the same is in closed or partially open position and being operable upon movement of the windshield.

6. The combination with a swinging windshield, an instrument board, and means for operating the windshield, of a ventilator shield interposed between the instrument board and windshield and having a bearing engagement with the latter, and means including a spring having one end anchored upon said instrument board and the opposite end secured to said ventilator shield for urging the latter into engagement with said windshield whereby the ventilator shield is operated upon movement of said windshield.

7. In a ventilator construction, an adjustable windshield, a cowl, an instrument board, a hood, and means for holding said hood in engagement with said windshield whereby said hood is adjusted by movement of said windshield to span the distance between the windshield and instrument board and to form therewith and with said cowl, an air directing passage.

8. The combination with an adjustable windshield, a cowl and an instrument board, of a ventilator hood, means pivotally supporting said hood in inoperative relation to said windshield cowl and instrument board, and means causing said hood to engage and follow said windshield whereby during the adjustment of the latter, an air directing passage is formed.

9. In a ventilator construction, an adjustable windshield having a lower outwardly swinging edge, a cowl with a sill engaged by said windshield in closed position, an instrument board arranged adjacent said cowl and sill but spaced therefrom, a hood pivotally supported between said cowl and instrument board and telescoping with the latter, and spring means normally urging said hood into engagement with said windshield, whereby, during the adjusted open positions of said windshield, said hood, instrument board and cowl form an air directing passage opening at one end adjacent the lower edge of said windshield.

10. In a ventilator construction, an adjustable windshield having a lower outwardly swinging edge, a cowl with a sill engaged by said windshield in closed position, an instrument board arranged adjacent said cowl and sill but spaced therefrom, a hood pivotally supported between said cowl and instrument board and telescoping with the latter, a spring urging said hood toward said windshield, and a stop for limiting the movement of said hood, whereby, said hood, instrument board, and cowl form an air directing passage, as and for the purpose set forth.

11. The combination with the lower edge of a swinging windshield, a cowl and sill, and an instrument board, of a ventilating hood, means pivotally supporting said hood between said cowl and instrument board, and means urging said hood into direct contact with said windshield edge during adjustment of the latter to span the space between the windshield and the instrument board.

12. In combination, a swinging windshield, means for operating said windshield, a ventilator shield positioned adjacent the lower edge of said windshield, and yieldable means acting upon said ventilator shield normally urging the latter into engagement with the windshield tending to move the latter to open position.

13. In combination, a swinging windshield, means for operating the same and a ventilator shield positioned adjacent the lower edge of said windshield and engageable therewith in the closed position of the same, said ventilator shield being automatically operable upon movement of the windshield to follow the same during the initial movement of the windshield toward open position.

14. The combination with an adjustable windshield, a cowl having a sill adapted for engagement with the windshield, and an air deflector supported independently of the windshield adjacent to the cowl and engaging the lower edge of said windshield when the same is in closed or partially open position and being movable therewith.

In testimony whereof I affix my signature.
ALBERT T. POTTER.